United States Patent
Choi

(10) Patent No.: US 9,025,029 B2
(45) Date of Patent: May 5, 2015

(54) APPARATUS AND METHOD FOR REMOVING A REFLECTED LIGHT FROM AN IMAGING DEVICE IMAGE

(71) Applicant: Hyundai Motor Company, Seoul (KR)

(72) Inventor: Jin Ha Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 370 days.

(21) Appl. No.: 13/688,126

(22) Filed: Nov. 28, 2012

(65) Prior Publication Data

US 2013/0329045 A1    Dec. 12, 2013

(30) Foreign Application Priority Data

Jun. 12, 2012 (KR) .......................... 10-2012-0062806

(51) Int. Cl.
| | |
|---|---|
| *H04N 7/18* | (2006.01) |
| *H04N 5/217* | (2011.01) |
| *H04N 5/225* | (2006.01) |
| *H04N 5/238* | (2006.01) |

(52) U.S. Cl.
CPC ............. *H04N 5/217* (2013.01); *H04N 5/2254* (2013.01); *H04N 5/238* (2013.01); *B60R 2300/30* (2013.01); *B60R 2300/80* (2013.01)

(58) Field of Classification Search
CPC ..... H04N 5/238; H04N 5/2254; H04N 5/217; B60R 2300/30; B60R 2300/80
USPC ................................... 348/148, 118, 119, 115
See application file for complete search history.

(56) References Cited

U.S. PATENT DOCUMENTS

| | | | |
|---|---|---|---|
| 6,313,454 B1 * | 11/2001 | Bos et al. ................... | 250/208.1 |
| 2003/0169213 A1 * | 9/2003 | Spero ................. | 345/7 |
| 2005/0035926 A1 | 2/2005 | Takenaga et al. | |
| 2005/0099527 A1 * | 5/2005 | Fujii .............................. | 348/360 |
| 2006/0132600 A1 * | 6/2006 | Chretien ........................ | 348/148 |
| 2006/0163458 A1 * | 7/2006 | Reime ....................... | 250/227.25 |
| 2007/0182816 A1 * | 8/2007 | Fox ............................... | 348/118 |
| 2011/0267200 A1 * | 11/2011 | Reynolds et al. ............. | 340/666 |
| 2012/0018989 A1 * | 1/2012 | Breed .......................... | 280/735 |

FOREIGN PATENT DOCUMENTS

| | | |
|---|---|---|
| JP | H06-319067 A | 11/1994 |
| JP | 9083879 A | 3/1997 |
| JP | 2005-195566 A | 7/2005 |
| KR | 1020010077691 A | 8/2001 |
| KR | 20-0359260 Y1 | 8/2004 |
| KR | 1020050091856 A | 9/2005 |
| KR | 20080004926 A | 1/2008 |

\* cited by examiner

*Primary Examiner* — Victor Kostak
(74) *Attorney, Agent, or Firm* — Mintz Levin Cohn Ferris Glovsky and Popeo, P.C.; Peter F. Corless

(57) ABSTRACT

Disclosed herein is an apparatus for removing a reflected light from an imaging device image, including a processor on a controller configured to output at a predetermined interval to a windshield or an imaging device lens, a control signal for controlling an on or off operation of at least one filter; obtain an image photographed by the camera, wherein the camera is installed in a direction toward the windshield of the vehicle, generate a differential image by subtracting a reflected image photographed when the filter is turned on from a general image photographed when the filter is turned off, and obtain a final image by correcting an area corresponding to the reflected image of the differential image based on a blurred image of the differential image.

12 Claims, 11 Drawing Sheets

<EDGE IMAGE OF REFLECTED IMAGE>

APPARATUS AND METHOD FOR REMOVING A REFLECTED LIGHT FROM AN IMAGING DEVICE IMAGE

CROSS-REFERENCE

This application is based on and claims priority to Korean Patent Application No. 10-2012-0062806 filed on Jun. 12, 2012, the disclosure of which is hereby incorporated in its entirety by reference.

BACKGROUND OF THE INVENTION

1. Field of the Invention

The present invention relates to an apparatus and a method for removing a reflected light from an imaging device image, and more particularly, to an apparatus and a method for removing a reflected light caused by a windshield of a vehicle from an image photographed by a front camera disposed substantially near the windshield inside of the vehicle.

2. Description of the Related Art

An exterior light passes through a windshield and may be partially reflected from a dashboard and may be partially transmitted as a reflected ray. The incident light from the exterior of the vehicle that may be reflected from the dashboard may be visible on the windshield.

Additionally, an imaging device which photographs a front view of the vehicle through the windshield may be disposed substantially near the windshield inside the vehicle. Thus, the image photographed by the camera may display the reflected light when the reflected light is visible on the windshield. Furthermore, in a substantially sunny weather condition, objects in the photographed image may appear blurred due to the reflected light displayed in the photographed image.

When applying a corresponding photographed image to, for example, a lane recognition system, a recognition rate may decrease or an erroneous recognition may occur due to the reflected light.

SUMMARY OF THE INVENTION

Accordingly, the present invention has been made in view of the above problems, and an object of the present invention is to provide an apparatus and a method for removing a reflected light from an imaging device image, in which a reflected light caused by a windshield is removed from an image photographed by a front camera disposed substantially near the windshield of the vehicle to minimize an error in recognizing a front image.

In addition, an object of the present invention is to provide an apparatus and a method for removing a reflected light from an imaging device image, in which the reflected light may be more easily removed from the camera image by powering an imaging device and a windshield filter on and off and correcting a differential image of photographed images.

In one embodiment of the present invention, an apparatus for removing a reflected light from an imaging device image is disclosed, the apparatus including a filter controller configured to output, at a predetermined interval to a windshield or an imaging device lens, a control signal for controlling an on or off operation of at least one filter, wherein the filter may be disposed on the windshield of a vehicle and the camera lens to enable the reflected light to pass therethrough; an image obtaining unit, executed by a processor on the controller, configured to obtain an image photographed by the camera which may be installed in a direction toward the windshield of the vehicle; a differential image generation unit, executed by the processor, configured to generate a differential image by subtracting a reflected, image photographed when the filter is turned on from a general image photographed when the filter is turned off; and a differential image correction unit, executed by the processor, configured to obtain a final image by correcting an area corresponding to the reflected image of the differential image based on a blurred image of the differential image. The differential image correction, unit detects a brightness level from the blurred image and corresponds the brightness level to the reflected image in the differential image. The differential image correction unit may fill in empty spaces on the area corresponding to the reflected area in the differential image. Additionally, the differential image correction unit may detect an edge area from the reflected, image and recognize the area corresponding to the reflected image from the differential image based on the detected edge area.

In another embodiment of the present invention, a method for removing a reflected light from an imaging device image is disclosed, including outputting, by a processor, at a predetermined interval to a windshield or an aging device lens a control signal for controlling an on or off operation of at least one filter, wherein the filter may be disposed on the windshield of a vehicle to enable the reflected light to pass therethrough; obtaining, by the processor, an image photographed by the camera installed in a direction toward the windshield of the vehicle during; generating, by the processor, a differential image by subtracting a reflected image photographed when the filter is turned on from a general image photographed when the filter is turned off; and obtaining, by the processor, a final image by correcting an area corresponding to the reflected image of the differential image based on a blurred image of the differential image. Obtaining, by the processor, the final image may include detecting, by the processor, a brightness level from the blurred image and corresponding the brightness level of the area to the reflected image in the differential image. Additionally, obtaining the final image may include filling in empty space on the area corresponding to the reflected area in the differential image. Furthermore, obtaining the final image may include detecting, by the processor, an edge area of the reflected image and recognizing the area corresponding to the reflected image from the differential image based on the detected edge area.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described herein with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
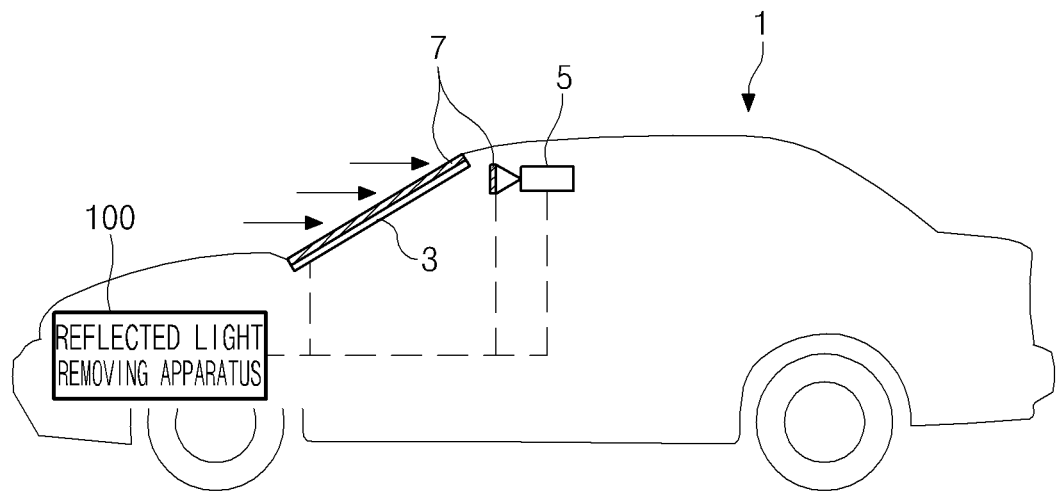
FIG. 1 is an exemplary view illustrating an apparatus for removing a reflected light from an imaging device image according to an exemplary embodiment of the present invention.

FIG. 1 is an exemplary view illustrating an apparatus for removing a reflected light from an imaging device image according to an exemplary embodiment of the present inversion.

FIG. 1 illustrates an apparatus 100 for removing a reflected light from an image photographed by an imaging device 5 (hereinafter, referred to as "a reflected light removal apparatus"), wherein a filter may be disposed on a windshield 3 of a vehicle 1 and a lens of the camera 5. Furthermore, a filter 7 (hereinafter, referred to as "a first filter") disposed on the windshield 3 and a filter (hereinafter, referred to as "a second filter") disposed on the lens of the camera 5, may be polarizing filters for detecting the reflected light on the windshield 3.

The reflected light removal apparatus 100 may be connected to the first filter or the second filter to control an on/off operation of the filters and to obtain an image photographed by the camera 5. Preferably, the reflected light removal apparatus 100 controls the on/off operation of the second filter; however, the present invention is not limited thereto. However, in an exemplary embodiment described below, as an illustrative example, the reflected light removal apparatus 100 is described controlling the on/off operation of the second filter.

In particular, the reflected light removal apparatus 100 may obtain a general image when a filter is turned off and may obtain a reflected image corresponding to the general image by turning on the filter during predetermined intervals of time. Therefore, the reflected light removal apparatus 100 may remove the reflected light from an image photographed by the camera 5 through the general image and the reflected image.

A detailed description of the apparatus 100 will be described with reference to FIG. 2.

Figure 2:
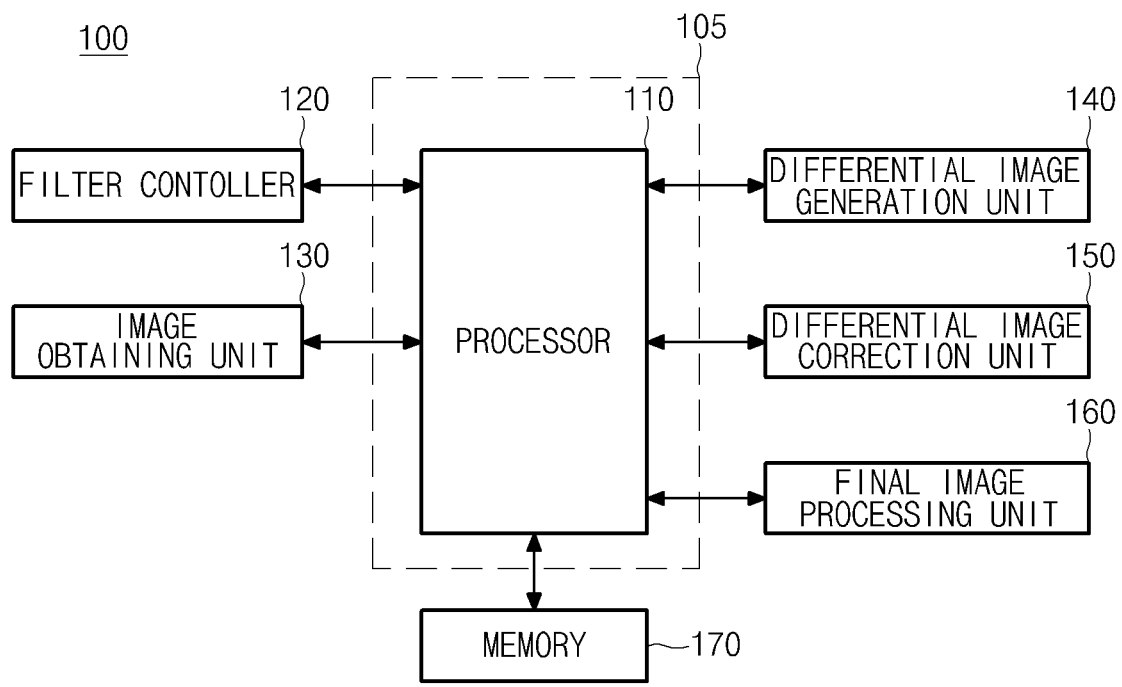
FIG. 2 is an exemplary block diagram illustrating a configuration of an apparatus for removing a reflected light from an imaging device image according to an exemplary embodiment of the present invention.

FIG. 2 is an exemplary block diagram illustrating a configuration of an apparatus for removing a reflected light from an imaging device image according to an exemplary embodiment of the present invention.

Referring to FIG. 2, the reflected light removal apparatus 100 may include a processor 110, a filter controller 120, and a plurality of units including an image obtaining unit 130, a differential image generation unit 140, a differential image correction unit 150, a final image processing unit 160, and a memory 170. The processor 110 on a controller 105 is configured to execute the plurality of units of the reflected light removal apparatus 100.

The filter controller 120 may be connected to the second filter to output a control signal to the second filter. Furthermore, the control signal outputted by the filter controller 120 may be a signal for controlling the on/off operation of the second filter. In particular, the filter controller 120 may control the on/off operation of the second filter according to a preset interval.

Furthermore, the filter controller 120 may turn off the second filter and turn on the second filter according to the preset interval. For example, the filter controller 120 may turn off the second filter at a starting time point of a first period and turn on the second filter at a finishing time point of the first period. The second filter may be turned off when a second period starts and turned on at a finishing time point of the second period. Thus, the second filter may be turned on according to the preset interval to enable only a polarized light to pass therethrough.

The image obtaining unit 130, executed by the processor 110, may obtain an image photographed by the camera disposed in the vehicle 1. Moreover, the camera 5 may be disposed in a direction toward the windshield of the vehicle. In this case, the image obtaining unit 130 may obtain the general image and the reflected image according to the on/off operation of the second filter. In particular, when the second filter is turned off, the general image may be obtained, and when the second filter is turned on, the reflected image may be obtained.

The differential image generation unit 140, executed by the processor 110, may generate a differential image by using the general image and the reflected image captured by the camera 5. In particular, the differential image generation unit 140 may generate the differential image by subtracting the reflected image captured when the second filter is turned on from the general image captured when the second filter is turned off in an age captured by the camera 5 during a time period.

The differential image correction unit 150 may correct the differential image generated by the differential image generation unit 140 to obtain a final image. Furthermore, the differential image correction unit 150 may generate a blurred image with respect to the differential image, wherein the blurred image is a reference image utilized when correcting the differential image. The differential image correction unit 150 may also detect a brightness level from the blurred image to correct a brightness level of the differential image.

The differential image correction unit 150 may correct an area corresponding to the reflected image of the differential image, rather than correcting a brightness level of an entire differential image. Moreover in this embodiment, the differential image correction unit 150 may detect an edge of the reflected image and may detect the area corresponding to the reflected image of the differential image based on edge information of the reflected image. Thus, the differential image correction unit 150 may correct an internal area defined by the edge of the reflected image of the differential image, thereby obtaining the final image. In addition, the differential image correction unit 150 may fill empty space on the internal area defined by the edge of the reflected image.

The final image processing unit 160, executed by the processor 110, may store the final image obtained by the differential image correction unit 150 in the memory 170 or may provide the final image to a system that is based on an imaging device image.

FIGS. 3 through 9 are exemplary views illustrating an operation of an apparatus for removing a reflected light from an imaging device image according to an exemplary embodiment of the present invention.

Figure 3:
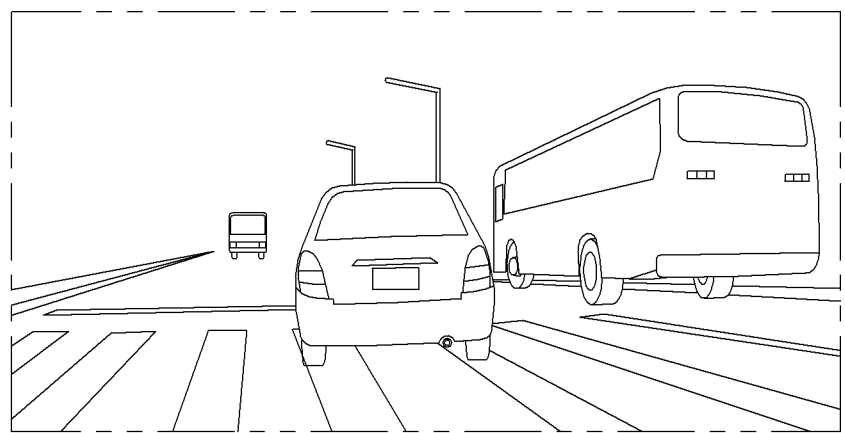
FIGS. 3 through 9 are exemplary views illustrating an operation of an apparatus for removing a reflected light from an imaging device image according to an exemplary embodiment of the present invention.
Figure 4:
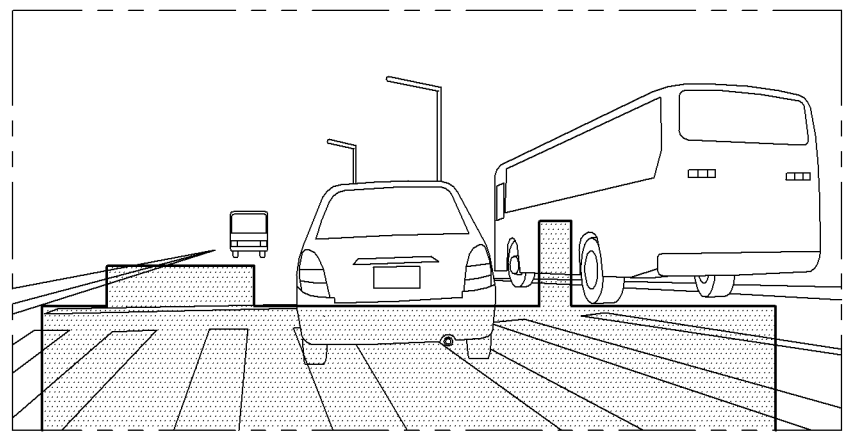

FIG. 3 illustrates an actual front view of a vehicle, FIG. 4 illustrates a front image photographed by an imaging device disposed within the vehicle, wherein the front image may be the general image photographed when the second filter is turned off. The image shown in FIG. 4 may be similar to the actual front view of the vehicle, however, the reflected light on the windshield may be shown on the photographed image since the camera photographs the front view through the windshield.

Although, a driver may recognize a frontal situation from the photographed image, when the image including the reflected light is used in, for example, a sensor that operates based on the image from the front camera, a recognition rate of the sensor may be lowered due to the reflection on the windshield.

Figure 5:
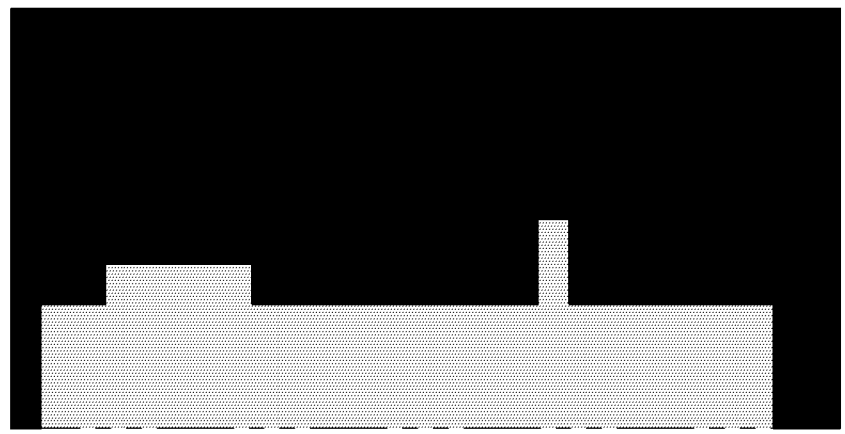

Similar to FIG. 4, FIG. 5 illustrates the front image photographed through the camera disposed within the vehicle and FIG. 5 illustrates the reflected image photographed when the second filter is turned on. In other words, when the second filter is turned on, other light may be blocked by the filters and only a light reflected by the windshield may pass therethrough such that the image photographed by the camera may only include the reflected light from the windshield.

Figure 6:
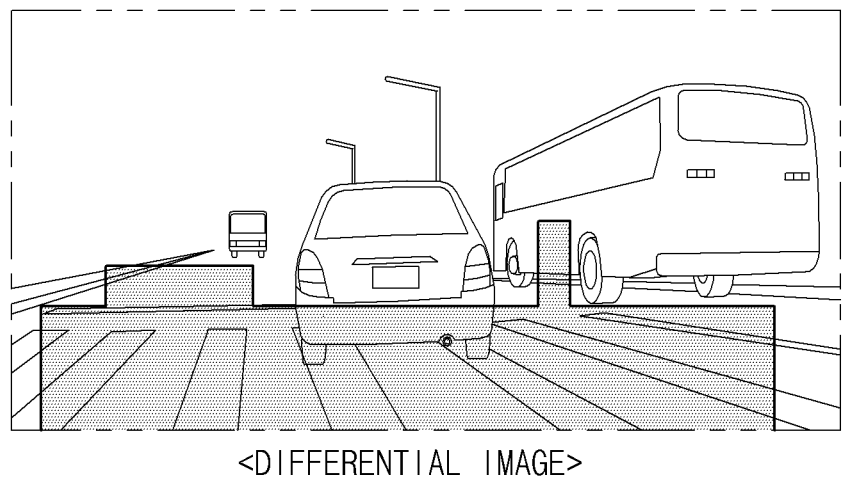
Figure 7:
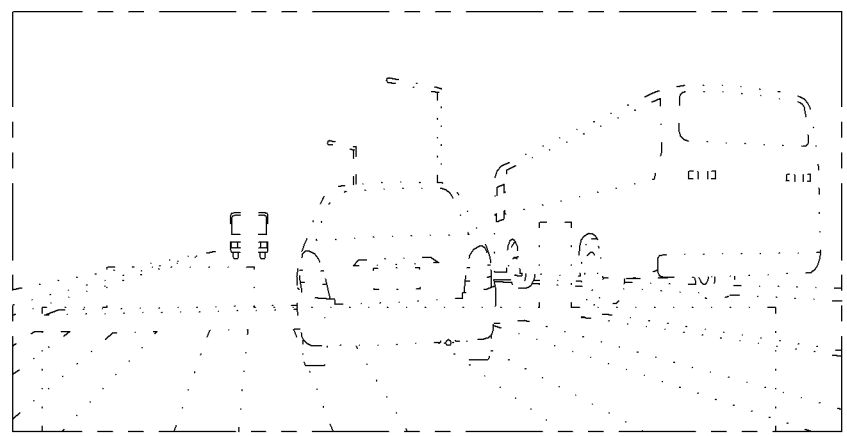

FIG. 6 illustrates the differential image in which the reflected image of FIG. 5 is removed from the general image of FIG. 4. FIG. 7 illustrates the blurred image obtained by blurring the differential image of FIG. 6. In the blurred image of FIG. 7, a brightness level of the area corresponding to the reflected image is substantially different from the remaining area such that brightness level information of the blurred image may be detected to correct the differential image.

Figure 8:
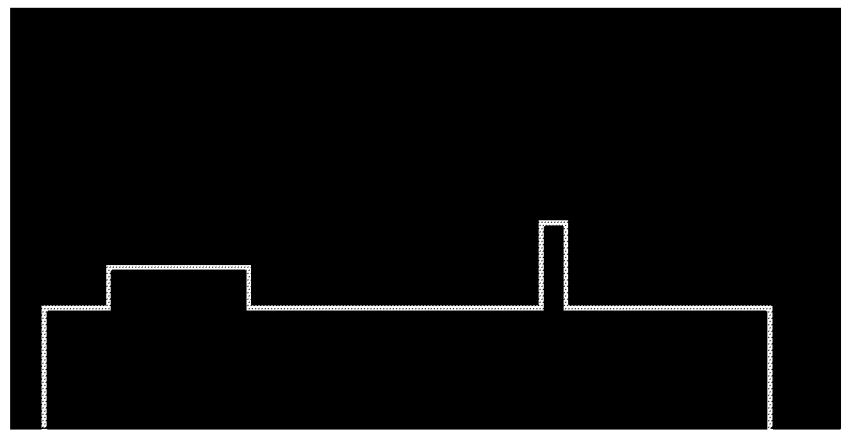

FIG. 8 illustrates an edge area detected from the reflected image of FIG. 5. An edge of the reflected image shown in FIG. 8 may be utilized to fill the empty space in the image when correcting the differential image.

Figure 9:
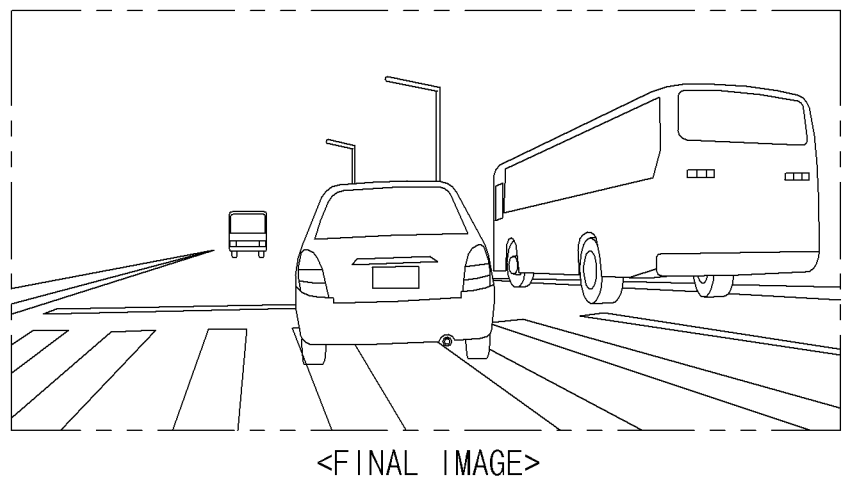

FIG. 9 illustrates the final image obtained by correcting the differential image of FIG. 6 with respect to the edge area of FIG. 8 according to the brightness level extracted from the blurred image of FIG. 7 and the empty space filling. As shown in FIG. 9, the reflected light has been substantially removed in comparison to the general image shown in FIG. 4. In this case, by substantially removing the reflected light from the front image photographed by the camera, inaccurate recognition and error may be minimized when applying the present invention to a sensing apparatus using the front image.

An operation of the reflected light removal apparatus according to the present invention having the above configuration is described in detail below.

Figure 10:
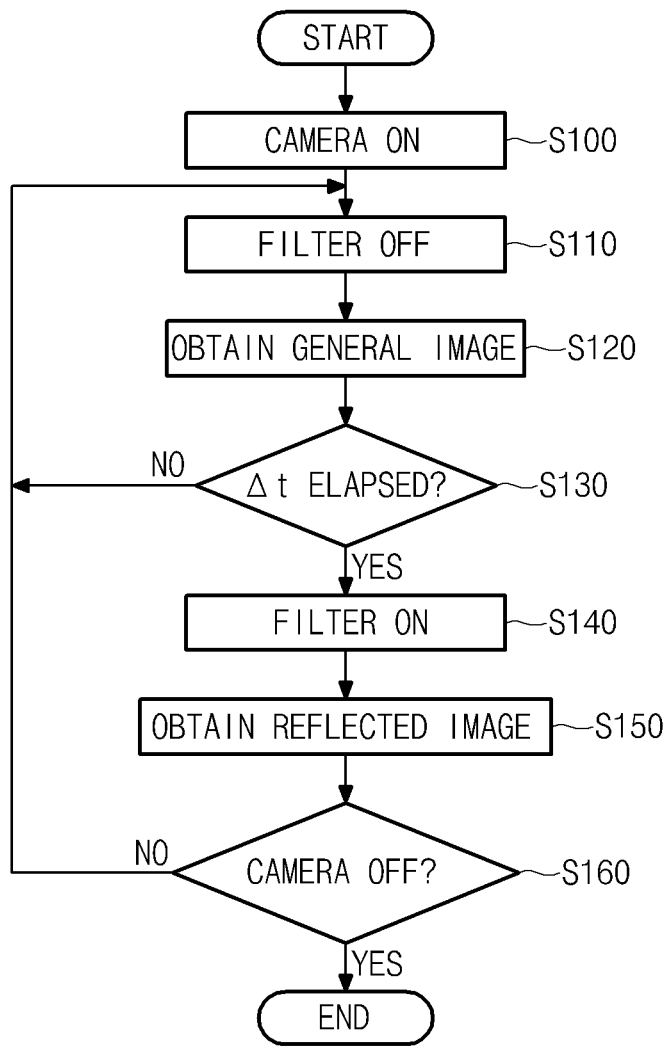
FIG. 10 is an exemplary flow chart illustrating an operation of obtaining an image in a method of removing a reflected light from an imaging device image according to an exemplary embodiment of the present invention.

FIG. 10 is an exemplary flow chart illustrating an operation of obtaining an image in a method of removing a reflected light from an imaging device image according to the invention.

Referring to FIG. 10, the reflected light removal apparatus according to the present invention may turn on the camera, which is disposed substantially near the windshield inside the vehicle, and is configured to photograph the front image of the vehicle (S100). The reflected light removal apparatus may turn off the second filter by outputting an off control signal to the second filter disposed on the camera (S110). When the second filter is turned off, the reflected light removal apparatus may obtain the general image through the camera (S120).

The reflected light removal apparatus may maintain the second filter in an off state until a certain period of time (Δt) elapses, and when the time elapses, the reflected light removal apparatus may output an on control signal to turn on the second filter (S140). When the second filter is turned on, the reflected light removal apparatus may obtain the reflected image through the camera (S150).

Figure 11:
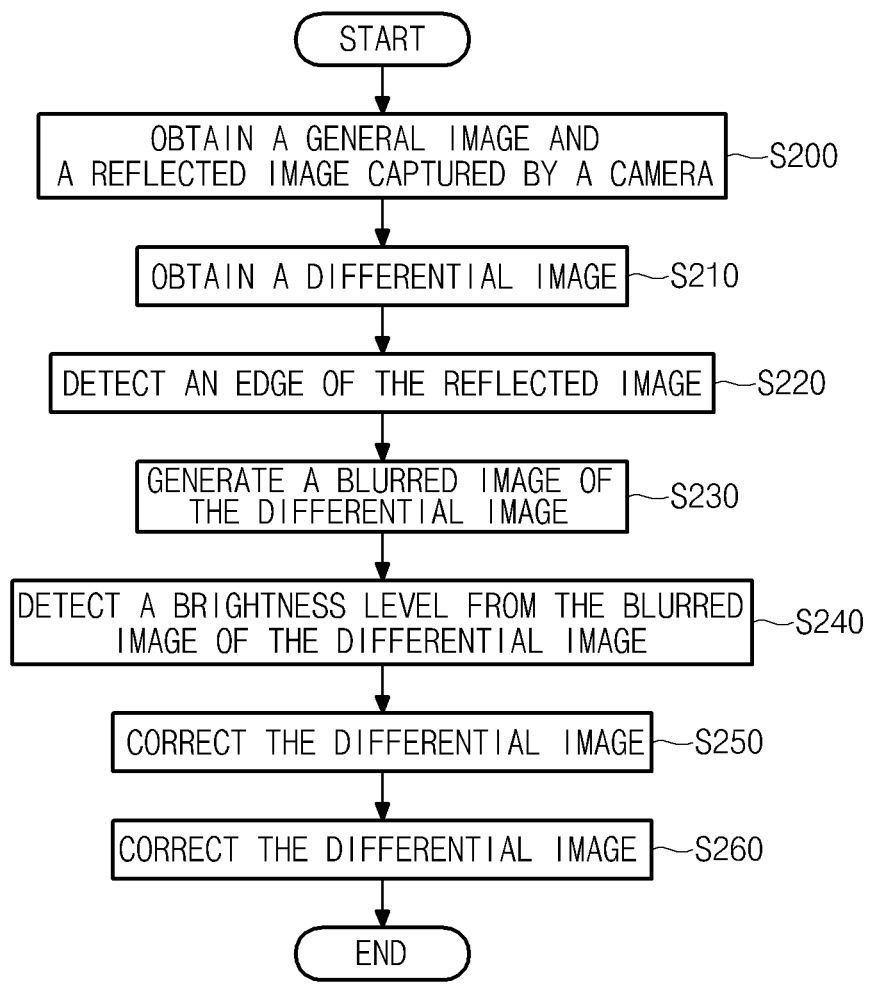
FIG. 11 is an exemplary flow chart illustrating a method of removing a reflected light from an imaging device image according to an exemplary embodiment of the present invention.

FIG. 11 is an exemplary flow chart illustrating a method of removing a reflected light from an imaging device image according to an exemplary embodiment of the present invention.

Referring to FIG. 11, the reflected light removal apparatus may obtain the general image and the reflected image captured through the camera in FIG. 10 (S200). Next, the reflected light removal apparatus may remove the reflected image from the general image, obtain the differential image (S210), and detect the edge of the reflected image to correct the differential image (S220). In addition, the reflected light removal apparatus may generate the blurred image of the differential image (S230) and detect the brightness level from the blurred image of the differential image (S240). Furthermore, the reflected light removal apparatus may correct the differential image based on the brightness level detected in step S240 (S250).

In step S250, an area corresponding to the edge area of the reflected image in the differential image may be corrected and the brightness level of a corresponding area of the differential image may be adjusted. Additionally, the reflected light removal apparatus may fill in empty space on the corresponding area in the differential image. Thus, the reflected light removal apparatus may obtain the final image in which the reflected light may be substantially removed from the camera image (S260).

The present invention may turn on or off a front camera disposed substantially near the windshield of the vehicle and one of the filters of the windshield of the vehicle, may correct a differential image of photographed images, thereby more easily removing a reflected light by windshield from an imaging device image, substantially removing a reflected light of camera images to minimize the erroneous recognition of the images.

Advantageously, the present invention may increase a range of vision since no shield is required for minimizing a reflected light, thus substantially eliminating a design restriction of a windshield or a loop caused by the windshield, thereby enabling the possibility of various designs for manufacturing a vehicle.

Although exemplary embodiments of the present invention have been described in detail hereinabove, it should be clearly understood that many variations, modifications, additions and substitutions of the basic inventive concepts herein are possible without departing from the spirit and scope of the present invention, as disclosed in the accompanying claims

What is claimed is:

1. An apparatus for removing a reflected light from an imaging device image, the apparatus comprising:
a controller including a processor configured to:
output, at a predetermined interval to a windshield or an imaging device lens, a control signal for controlling an on or off operation of at least one filter, wherein the filter is disposed on the windshield of a vehicle and the camera lens to enable the reflected light to pass therethrough;
obtain an image photographed by the camera, wherein the camera is installed in a direction toward the windshield of the vehicle;
generate a differential image in the image photographed by the camera, by subtracting a reflected image photographed when the filter is turned on from a general image photographed when the filter is turned off; and
obtain a final image by correcting an area corresponding to the reflected image of the differential image based on a blurred image of the differential image.

2. The apparatus of claim 1, wherein the processor is further configured to detect a brightness level from the blurred image to correct a brightness level of the area corresponding to the reflected image in the differential image.

3. The apparatus of claim 1, wherein the processor is further configured to fill empty spaces on the area corresponding to the reflected area in the differential image.

4. The apparatus of claim 1, wherein the processor is further configured to detect an edge area of the reflected image and recognize the area corresponding to the reflected image from the differential image based on the detected edge area.

5. A method of removing a reflected light from an imaging device image, the method comprising:
outputting at a predetermined interval to a windshield or an imaging device lens, by a controller including a processor, a control signal for controlling an on or off operation of at least one filter, wherein the filter is disposed on the windshield of a vehicle and the camera lens to enable the reflected light to pass therethrough;
obtaining, by the processor, an image photographed by the camera, wherein the camera is installed in a direction toward the windshield of the vehicle during;
generating, by the processor in an image photographed by the camera, a differential image by subtracting a reflected image photographed when the filter is turned on from a general image photographed when the filter is turned off;
and
obtaining, by the processor, a final image by correcting an area corresponding to the reflected image of the differential image based on a blurred image of the differential image.

6. The method of claim 5, wherein obtaining the final image, by the processor, further comprises:
detecting, by the processor, a brightness level from the blurred image to correct a brightness level of the area corresponding to the reflected image.

7. The method of claim 5, wherein obtaining the final image, by the processor, further comprises:
filling empty spaces on the area corresponding to the reflected area in the differential image.

8. The method of claim 5, wherein obtaining the final image further comprises:
detecting an edge area of the reflected image and recognizing the area corresponding to the reflected image from the differential image based on the detected edge area.

9. A non-transitory computer readable medium, containing program instructions executed by a processor on a controller, the computer readable medium comprising:
program instructions that output at a predetermined interval to a windshield or an imaging device lens, a control signal for controlling an on or off operation of at least one filter, wherein the filter is disposed on the windshield of a vehicle and the camera lens to enable the reflected light to pass therethrough;
program instructions that obtain, an image photographed by the camera, wherein the camera is installed in a direction toward the windshield of the vehicle during;
program instructions that generate in an image photographed by the camera, a differential image by subtracting a reflected image photographed when the filter is turned on from a general image photographed when the filter is turned off; and
program instructions that obtain, a final image by correcting an area corresponding to the reflected image of the differential image based on a blurred image of the differential image.

10. The non-transitory computer readable medium of claim 9, wherein the program instructions that obtain the final image, further comprise:
program instructions that detect a brightness level from the blurred image to correct a brightness level of the area corresponding to the reflected image.

11. The non-transitory computer readable medium of claim 9, wherein the program instructions that obtain the final image, further comprise:
program instructions that fill empty spaces on the area corresponding to the reflected area in the differential image.

12. The non-transitory computer readable medium of claim 9, wherein the program instructions that obtain the final image further comprise:
program instructions that detect an edge area of the reflected image and recognize the area corresponding to the reflected image from the differential image based on the detected edge area.

* * * * *